(12) United States Patent
Hu et al.

(10) Patent No.: US 12,301,387 B2
(45) Date of Patent: May 13, 2025

(54) CM BASED CHANNEL STATUS INFORMATION ENHANCEMENT

(71) Applicant: Samsung Electronics Co., Ltd., Suwon-si (KR)

(72) Inventors: Yeqing Hu, Allen, TX (US); Yang Li, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 18/446,386

(22) Filed: Aug. 8, 2023

(65) Prior Publication Data

US 2024/0073063 A1    Feb. 29, 2024

Related U.S. Application Data

(60) Provisional application No. 63/399,136, filed on Aug. 18, 2022.

(51) Int. Cl.
*H04L 25/02*    (2006.01)

(52) U.S. Cl.
CPC ........ *H04L 25/0242* (2013.01); *H04L 25/021* (2013.01)

(58) Field of Classification Search
CPC .......... H04L 25/0242; H04L 25/021; H04L 25/0224
USPC ................ 375/219–222, 260–262
See application file for complete search history.

(56) References Cited

U.S. PATENT DOCUMENTS

| 10,327,221 | B1  |    | 6/2019  | Sarrigeorgidis |            |
|------------|-----|----|---------|----------------|------------|
| 11,290,138 | B1  | *  | 3/2022  | Kutz           | H04B 1/0475|
| 11,558,074 | B2  |    | 1/2023  | Paker et al.   |            |
| 2019/0075091 | A1 | * | 3/2019  | Shattil        | H04L 5/0007|
| 2021/0036749 | A1 | * | 2/2021  | Qiang          | H04B 7/0478|
| 2022/0286257 | A1 | * | 9/2022  | Wu             | H04B 7/0478|
| 2023/0336321 | A1 | * | 10/2023 | Sim            | H04L 5/1461|
| 2023/0387990 | A1 | * | 11/2023 | Ibrahim        | H04B 7/0626|
| 2023/0388837 | A1 | * | 11/2023 | Ibrahim        | H04L 5/0005|

FOREIGN PATENT DOCUMENTS

| CN | 108989816 A | 12/2018 |
| WO | 2007035993 A1 | 4/2007 |

* cited by examiner

*Primary Examiner* — Emmanuel Bayard

(57) ABSTRACT

Methods and apparatuses for canonical model (CM) based channel status information enhancement. A base station includes a transceiver configured to receive a reference signal from a user equipment (UE) and a processor operably coupled to the transceiver. The processor is configured to perform a linear transformation based on the received reference signal, select a basis set based on the linear transformation, select a set of kernels based on the selected basis set and the linear transformation, and reconstruct a channel based on the selected set of kernels.

20 Claims, 10 Drawing Sheets

CM BASED CHANNEL STATUS INFORMATION ENHANCEMENT

CROSS-REFERENCE TO RELATED APPLICATION(S) AND CLAIM OF PRIORITY

This application claims priority under 35 U.S.C. § 119(e) to U.S. Provisional Patent Application No. 63/399,136 filed on Aug. 18, 2022. The above-identified provisional patent application is hereby incorporated by reference in its entirety.

TECHNICAL FIELD

This disclosure relates generally to wireless networks. More specifically, this disclosure relates to a canonical model (CM) based channel status information enhancement.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides apparatuses and methods for a canonical model (CM) based channel status information enhancement.

In one embodiment, a base station (BS) is provided. The BS includes a transceiver. The transceiver is configured to receive a reference signal from a user equipment (UE). The BS further includes a processor operably coupled to the transceiver. The processor is configured to perform a linear transformation based on the received reference signal, select a basis set based on the linear transformation, select a set of kernels based on the selected basis set and the linear transformation, and reconstruct a channel based on the selected set of kernels.

In another embodiment, a method performed by a BS is provided. The method includes receiving a reference signal from a UE, performing a linear transformation based on the received reference signal, selecting a basis set based on the linear transformation, selecting a set of kernels based on the selected basis set and the linear transformation, and reconstructing a channel based on the selected set of kernels.

In yet another embodiment, A non-transitory computer readable medium embodying a computer program is provided. The computer program includes program code that, when executed by a processor of a device, causes the device to receive a reference signal from a UE, perform a linear transformation based on the received reference signal, select a basis set based on the linear transformation, select a set of kernels based on the selected basis set and the linear transformation, and reconstruct a channel based on the selected set of kernels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
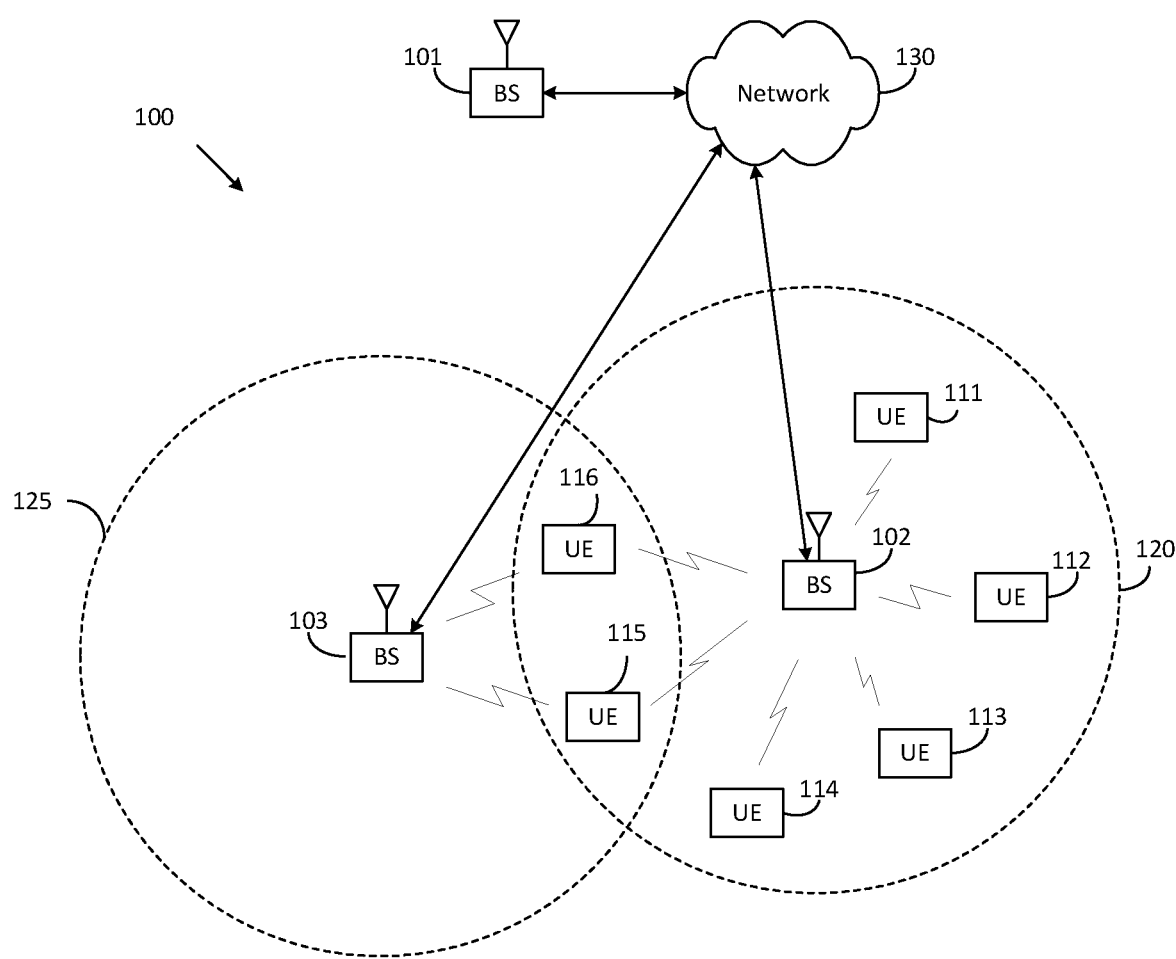
FIG. 1 illustrates an example wireless network according to embodiments of the present disclosure.
Figure 2:
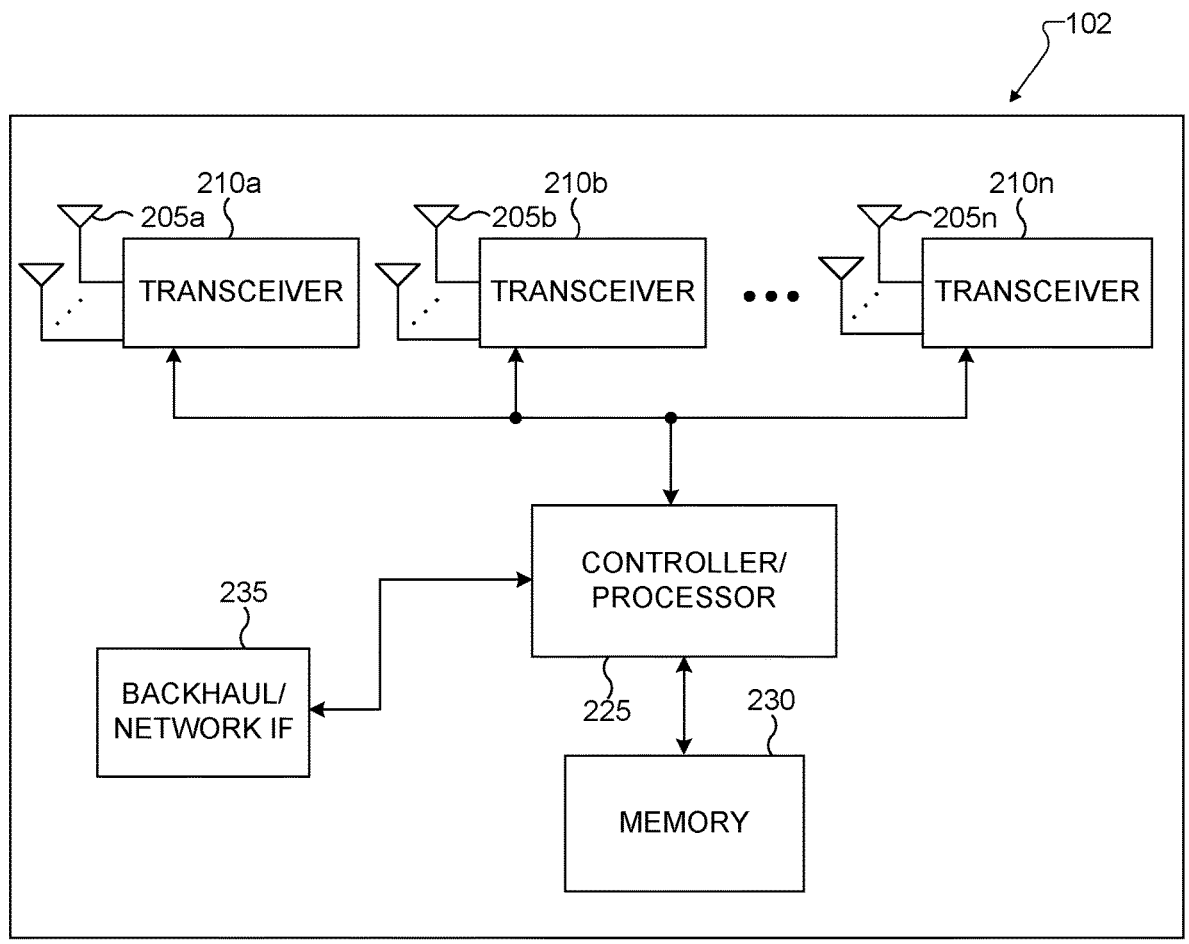
FIG. 2 illustrates an example gNB according to embodiments of the present disclosure.
Figure 3:
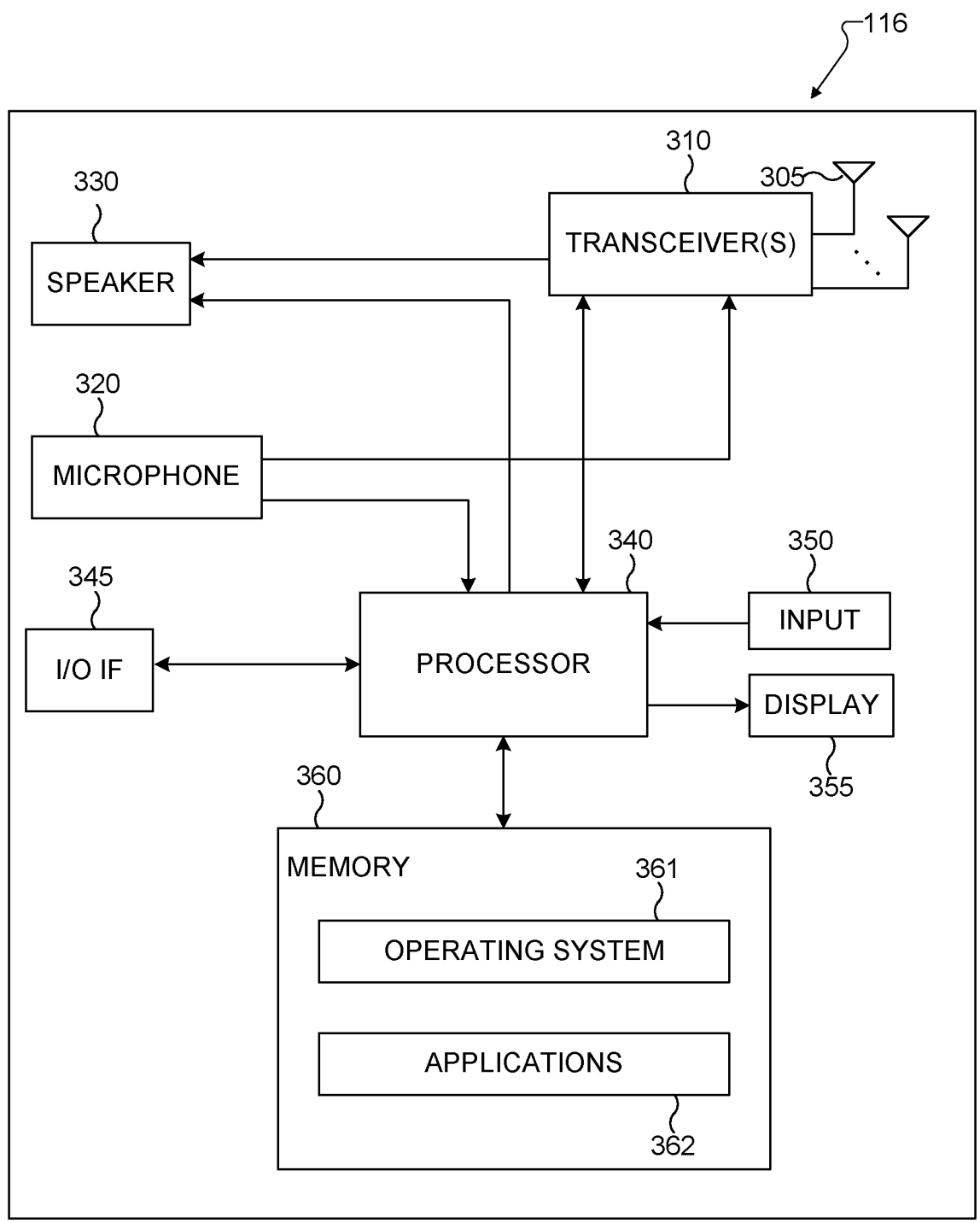
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a CM based channel status information enhancement. In certain embodiments, one or more of the gNBs 101-103 includes circuitry, programing, or a combination thereof, to support a CM based channel status information enhancement in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS and, for example, processes to support a CM based channel status information enhancement as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for a CM based channel status information enhancement as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
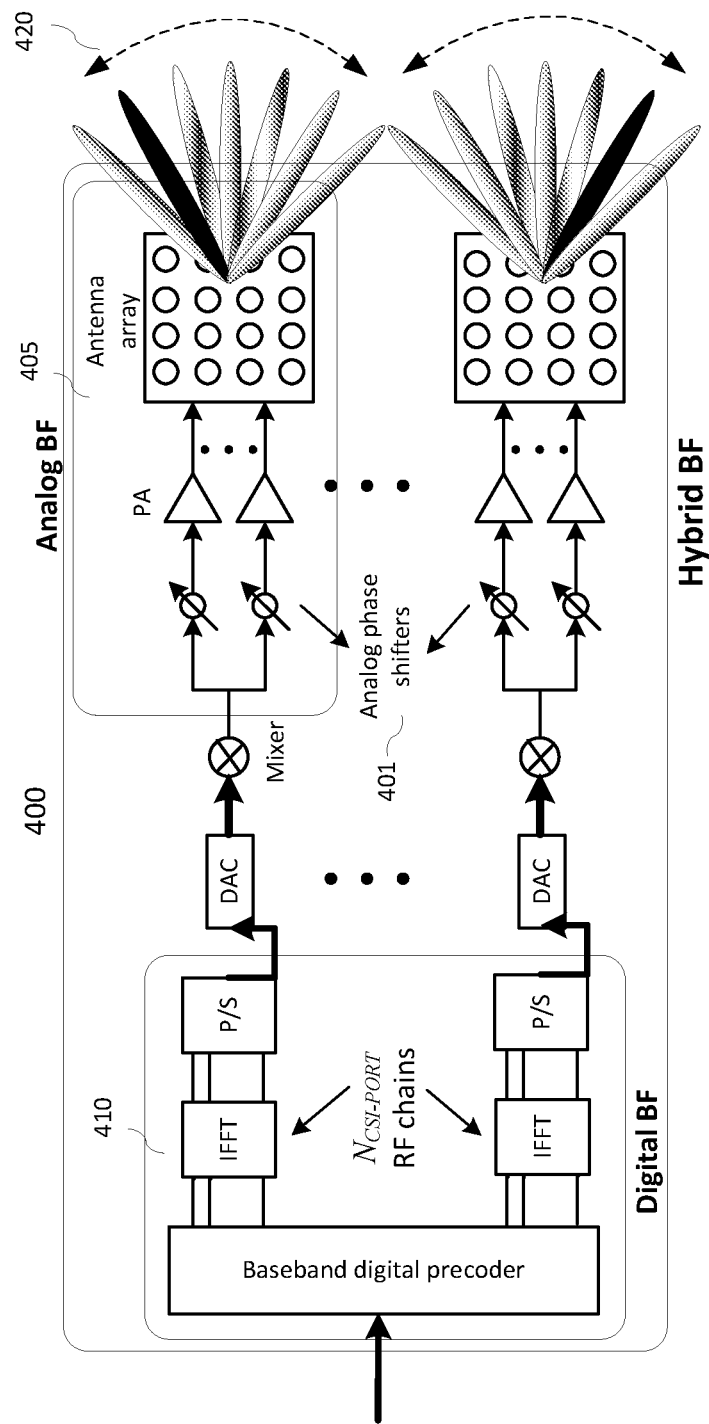
FIG. 4 illustrates an example antenna blocks or arrays according to embodiments of the present disclosure.

FIG. 4 illustrates example antenna blocks or arrays 400 according to embodiments of the present disclosure. The embodiment of the antenna blocks or arrays 400 illustrated in FIG. 4 is for illustration only. Different embodiments of antenna blocks or arrays 400 could be used without departing from the scope of this disclosure.

A unit for downlink (DL) signaling or for uplink (UL) signaling on a cell is referred to as a slot and may include one or more symbols. A bandwidth (BW) unit is referred to as a resource block (RB). One RB includes a number of sub-carriers (SCs). For example, a slot may have duration of one millisecond and an RB may have a bandwidth of 180 KHz and include 12 SCs with inter-SC spacing of 15 KHz. A slot may be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. A UE may be indicated a spatial setting for a PDCCH reception based on a configuration of a value for a transmission configuration indication state (TCI state) of a control resource set (CORESET) where the UE receives the PDCCH. The UE may be indicated by a spatial setting for a PDSCH reception based on a configuration by higher layers or based on activation or indication by MAC CE or based on an indication by a DCI format scheduling the PDSCH reception of a value for a TCI state. The gNB may configure the UE to receive signals on a cell within a DL bandwidth part (BWP) of the cell DL BW.

A gNB (such as BS 103 of FIG. 1) transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources. A UE (such as UE 116 of FIG. 1) may determine CSI-RS transmission parameters through DL control signaling or higher layer signaling, such as an RRC signaling from a gNB. Transmission instances of a CSI-RS may be indicated by DL control signaling or configured by higher layer signaling. A DMRS is transmitted only in the BW of a respective PDCCH or PDSCH and a UE may use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH may be transmitted over a variable number of slot symbols including one slot symbol. The gNB may configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information may be configured to be with a smaller granularity than per TB and may be per data code block (CB) or per group of data CBs where a data TB includes a number of data.

A CSI report from a UE may include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB may use a DMRS to demodulate information in a respective PUSCH or PUCCH. SRS is transmitted by a UE to provide a gNB with an UL CSI and, for a TDD system, an SRS transmission may also provide a PMI for DL transmission. Additionally, in order to establish synchronization or an initial higher layer connection with a gNB, a UE may transmit a physical random-access channel (PRACH).

Rel-14 LTE and Rel-15 NR support up to 32 CSI-RS antenna ports which enable an eNB or a gNB to be equipped with a large number of antenna elements (such as 64 or 128). A plurality of antenna elements may then be mapped onto one CSI-RS port. For mmWave bands, although a number of antenna elements may be larger for a given form factor, a number of CSI-RS ports, that may correspond to the number of digitally precoded ports, may be limited due to hardware constraints (such as the feasibility to install a large number of ADCs/DACs at mmWave frequencies) as illustrated in FIG. 4. Then, one CSI-RS port may be mapped onto a large number of antenna elements that may be controlled by a bank of analog phase shifters 401. One CSI-RS port may then correspond to one sub-array which produces a narrow analog beam through analog beamforming 405. This analog beam may be configured to sweep across a wider range of angles (420) by varying the phase shifter bank across symbols or slots/subframes. The number of sub-arrays (equal to the number of RF chains) is same as the number of CSI-RS ports $N_{CSI-PORT}$. A digital beamforming unit 410 performs a linear combination across $N_{CSI-PORT}$ analog beams to further increase a precoding gain. While analog beams are wideband (hence not frequency-selective), digital precoding may be varied across frequency sub-bands or resource blocks. Receiver operation may be conceived analogously.

Since the above system utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz. In this case, the system may employ only analog beams. Due to the O2 absorption loss around 60 GHz frequency (~10 dB additional loss per 100 m distance), a larger number and narrower analog beams (hence larger number of radiators in the array) are needed to compensate for the additional path loss.

Although FIG. 4 illustrates one example antenna blocks or arrays 400, various changes may be made to FIG. 4. For example, various components in FIG. 4 could be combined, further subdivided, or omitted and additional components could be added according to particular needs.

Obtaining accurate channel state information (CSI) is the cornerstone for wireless communication, especially in a multi-antenna system. Massive multiple-input-multiple-output (MIMO) is the backbone technology for beyond 5G communication system. Under such a setting, CSI is particularly critical to enable the promised high throughput.

CSI is estimated via reference signals (RS). In the uplink, the user equipment (UE) transmits a sounding reference signal (SRS) to the gNB. The gNB estimates the uplink (UL) channel via the SRS. In a time-division-duplex (TDD) system, according to reciprocity, the UL channel is equivalent to the downlink (DL) channel, and the gNB can thus use CSI estimated from SRS to perform DL transmission. In the DL, the gNB transmits a demodulation reference signal (DMRS), which enables the UE to estimate the DL channel and perform demodulation for data reception. The SRS and DMRS are typically transmitted periodically.

When estimating CSI, two major challenges can degrade the estimation quality: mobility and low signal to noise ratio (SNR).

In a mobility scenario, CSI is estimated and then usually held the same until the next RS is available. During this period, two delays are introduced: the processing delay for obtaining estimates, and the holding period. During this time, the channel is possibly already changed due to the UE's mobility, therefore the CSI used for DL transmission becomes inaccurate across time.

In low SNR scenarios, the RS is more corrupted by noise, and hence the obtained CSI is also noisy.

This disclosure targets to improve the CSI quality under the aforementioned two scenarios, by exploring the canonical structure of the wireless channel representation. In particular, for the mobility scenario, CSI is predicted for the next period of time based on previous estimation; for the low SNR scenario, de-noising the CSI estimates exploring the CM signal structure is described.

Consider a wireless propagation channel, with P paths, each path has angle-of-arrival $\theta_p$, delay $\tau_p$, Doppler $v_p$, and complex weight $\gamma_p$. Consider the SRS received at the gNB side on a K-element linear antenna array. The channel received at the k-th antenna element, on the m-th frequency resource block (RB), and the n-th time instance can be written as $$h_{k,m}(n) = \sum_p \gamma_p e^{-j2\pi k \Delta d \cos\theta_p} e^{-j2\pi m \Delta f \tau_p} e^{j2\pi n \Delta t v_p},$$

where $\Delta d$ is the normalized antenna element spacing, $\Delta f$ is the RB spacing, and $\Delta t$ is the observation time interval.

Consider the channel received at one time instance, on all RBs and all antennas, written as below $$H(n) = \begin{bmatrix} h_{1,1}(n) & h_{2,1}(n) & & h_{K,1}(n) \\ h_{1,2}(n) & h_{2,2}(n) & & h_{K,2}(n) \\ \vdots & \vdots & \ddots & \vdots \\ h_{1,M}(n) & h_{2,M}(n) & & h_{K,M}(n) \end{bmatrix}$$

According to the canonical model (CM), the wireless channel can be represented in terms of fixed and orthogonal (e.g. discrete Fourier transform [DFT]) basis regardless of the ground truth parameters.

For example, consider the frequency domain channel on one antenna, M RBs, the CM can decompose the channel into the below representation $$h_{k,\cdot}(n) = \begin{bmatrix} h_{k,1}(n) \\ h_{k,2}(n) \\ \vdots \\ h_{k,M}(n) \end{bmatrix} = \sum_{m=1 \ldots M} g_{k,m} \begin{bmatrix} 1 \\ e^{-\frac{j2\pi(m-1)}{M}} \\ \vdots \\ e^{-\frac{j2\pi(M-1)(m-1)}{M}} \end{bmatrix}.$$

Consider the channel on all antennas, one RBs, the CM can decompose the channel into the below representation $$h_{\cdot,m}^T(n) = [h_{1,m}(n), h_{2,m}(n), \ldots h_{K,m}(n)] =$$

$$\sum_{k=1 \ldots K} g_{k,m} \left[ 1, e^{-\frac{j2\pi(k-1)}{K}}, \ldots e^{-\frac{j2\pi(K-1)(k-1)}{K}} \right].$$

Consider the decomposition in both antenna and frequency domain, the channel can be represented by $$H(n) = B_f G(n) B_a,$$

where $$B_f = \begin{bmatrix} 1 & 1 & & 1 \\ 1 & e^{-\frac{j2\pi(m-1)}{M}} & & e^{-\frac{j2\pi(M-1)}{M}} \\ \vdots & \vdots & \ldots & \vdots \\ 1 & e^{-\frac{j2\pi(M-1)(m-1)}{M}} & & e^{-\frac{j2\pi(M-1)(M-1)}{M}} \end{bmatrix}$$

is the frequency domain basis, and $$B_a = \begin{bmatrix} 1, & 1, & \ldots & 1 \\ & & \vdots & \\ 1, & e^{-\frac{j2\pi(k-1)}{K}}, & \ldots & e^{-\frac{j2\pi(K-1)(k-1)}{K}} \\ & & \vdots & \\ 1, & e^{-\frac{j2\pi(K-1)}{K}}, & \ldots & e^{-\frac{j2\pi(K-1)(K-1)}{K}} \end{bmatrix}$$

is the angular domain basis.
G(n) is termed as the 'kernel' for channel representation at time instance n, and can be obtained as $$G(n) = B_f^H H(n) B_a^H.$$

Let $g_{km}(n)$ denote the kernel coefficient for the k-th spatial basis, and the m-th frequency basis.

Note that the bases $B_f$ and $B_a$ are constant, and the kernel G(n) changes according to channel's time evolution.

The basis decomposition can also be done in Doppler domain. For example, a Doppler spectrum estimation may be performed by concatenating the channel matrix observation at different times into a three-dimensional tensor. An illustration is given in FIG. 5.

Figure 5:
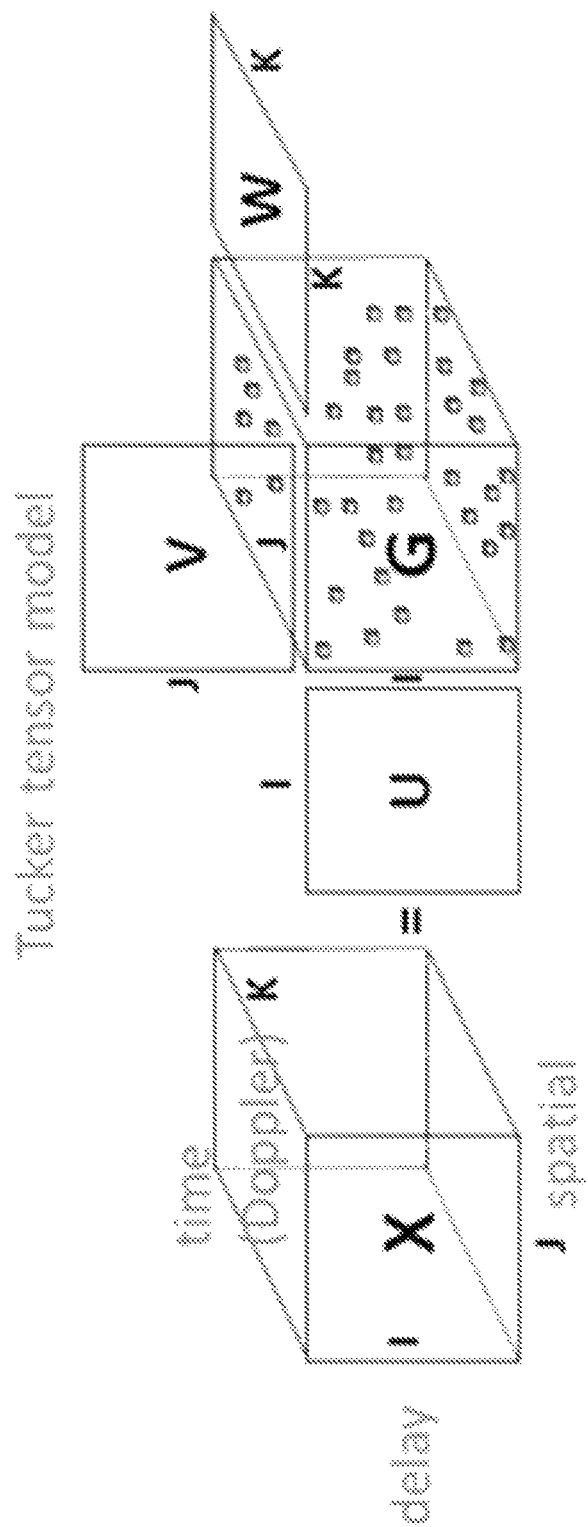
FIG. 5 illustrates an example basis decomposition according to embodiments of the present disclosure.

FIG. 5 illustrates an example basis decomposition according to embodiments of the present disclosure. The embodiment of the basis decomposition illustrated in FIG. 5 is for illustration only. Different embodiments of basis decomposition could be used without departing from the scope of this disclosure.

After translating the channel H into the kernel G domain, not all kernels have significant energy. One illustration is given in FIG. 6, with color index in dB.

Figure 6:
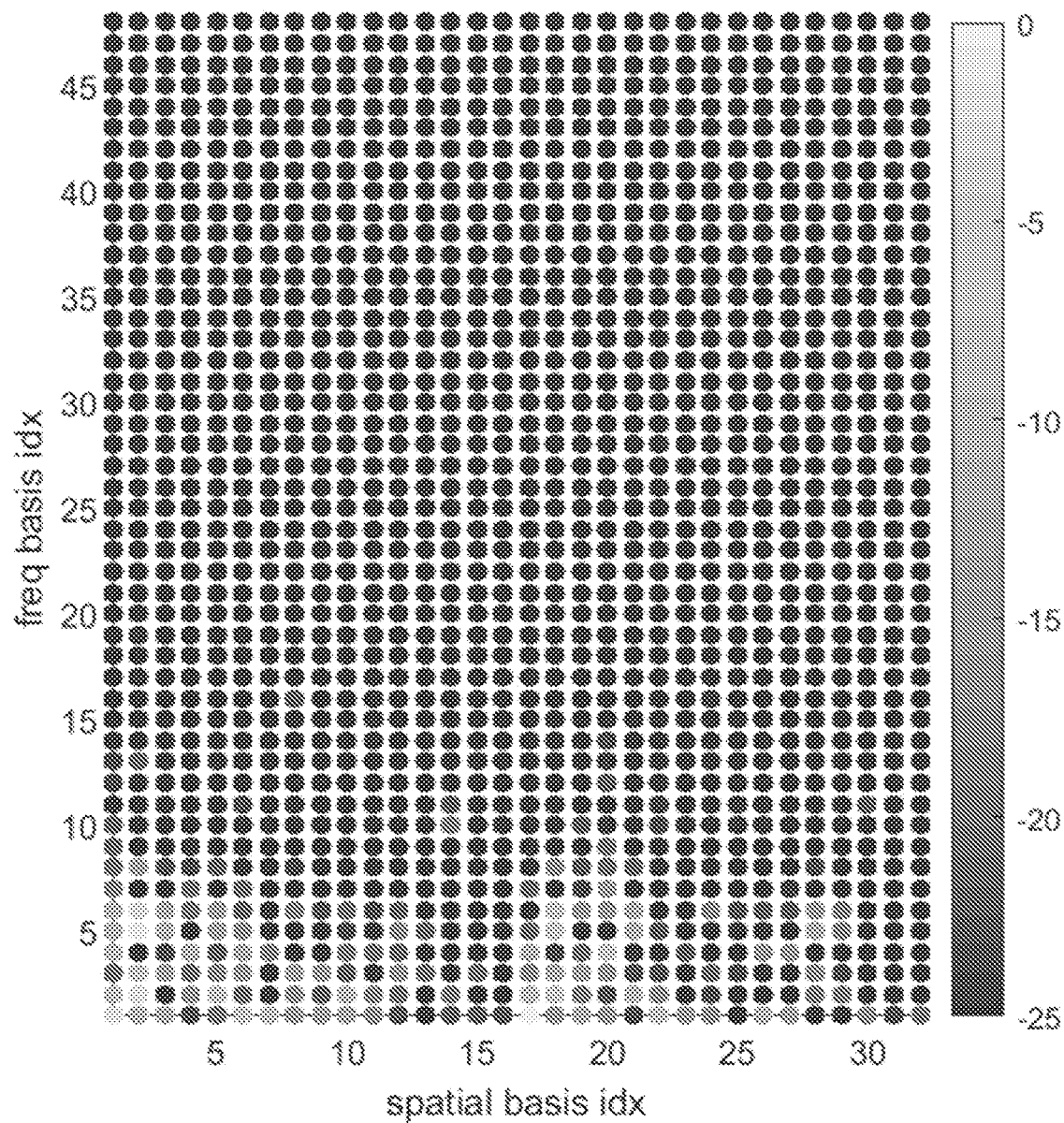
FIG. 6 illustrates an example translation into a kernel domain according to embodiments of the present disclosure.

FIG. 6 illustrates example translation into a kernel domain according to embodiments of the present disclosure. The embodiment of the translation illustrated in FIG. 5 is for illustration only. Different embodiments of translation could be used without departing from the scope of this disclosure.

Figure 7:
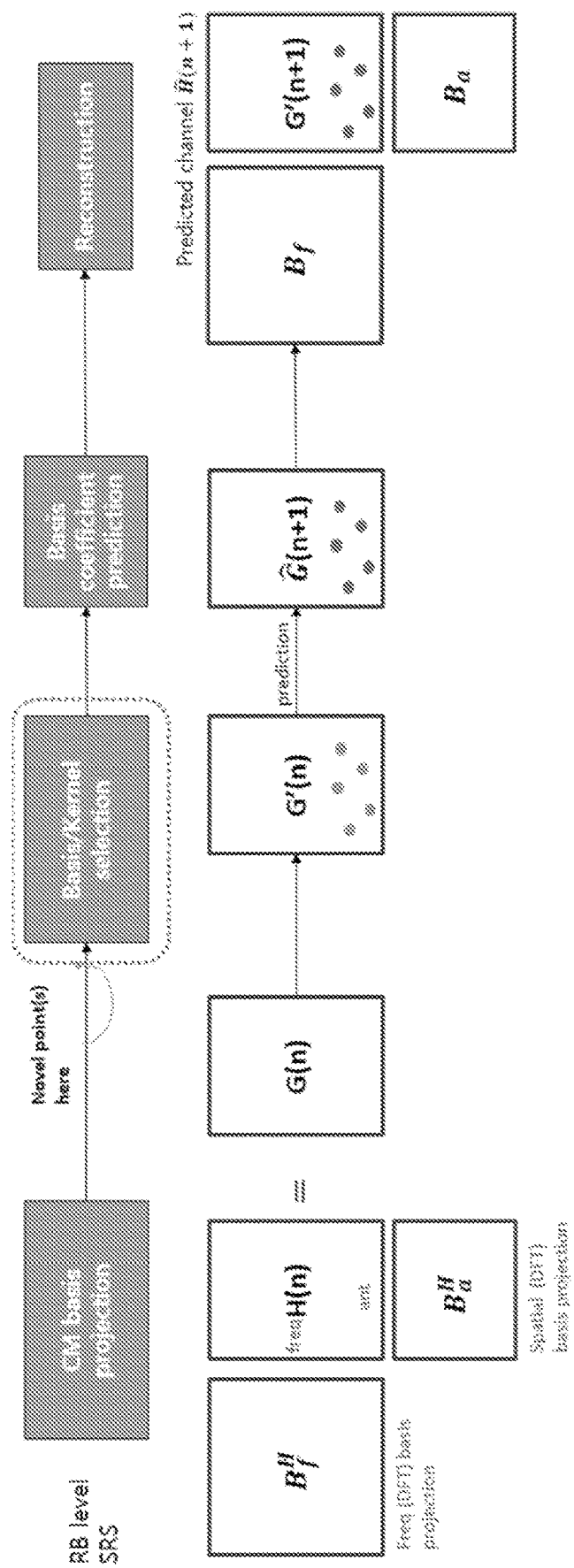
FIG. 7 illustrates an example CSI prediction according to embodiments of the present disclosure.

The goal for CSI prediction is to provide an estimate for the channel coefficients at (n+1)-th time instance, based on past observations of channel coefficients. For the CM signal decomposition, the prediction is performed in the kernel domain. FIG. 7 illustrates the procedure for the prediction.

FIG. 7 illustrates an example CSI prediction according to embodiments of the present disclosure. The embodiment of prediction illustrated in FIG. 7 is for illustration only. Different embodiments of CSI prediction could be used without departing from the scope of this disclosure.

The example of FIG. 7 may be summarized in the following series of steps.

Step 1: construct/select the set of CM basis, project the channel onto the basis, and obtain the kernel representation at each time instance.

Step 2: select a subset of kernels.

Step 3: for the selected subset of kernels, perform prediction.

Step 4: using predicted kernel coefficients and basis to construct predicted channel. Assuming Q kernels are selected for prediction, each kernel q associated with delay and spatial basis vector $b_f(\tau_q)$ and $b_a(p74_q)$, the predicted channel can be written as $\hat{H}(n+1) = \Sigma_q b_f(\tau_q) \cdot b_a^T(\theta_q) \cdot \hat{g}_q(n+1)$, where $\hat{g}_q(n+1)$ is the predicted coefficient for kernel g at time instance n+1.

Even though Step 1 described above describes projecting the channel based on a CM basis projection, the channel may be projected by other methods, such as any linear transformation projection.

Although FIG. 7 illustrates one example of CSI prediction, various changes may be made to FIG. 7. For example, the steps may change, the subset of kernels may change, etc.

When predicting the next time instance's kernel, linear prediction can be deployed, and the prediction weight can be computed as $$w_i = \mathrm{argmin} E\left[ \sum_{j=1}^{nSamples} \left| g_{ij}(t) - g_{ij}(t-1:t-L) w_i \right|^2 \right]$$

$g_{ij}$: coefficients to predict, i as group factor, j as sample index of the group. Samples in the same group share the same weight.

$g_{ij}(t-1:t-L) = [g_{ij}(t-1), g_{ij}(t-2) \ldots g_{ij}(t-L)]$, and L is the buffer length to accumulate observations to do prediction.

$w_i$: i-th prediction weight

One option is to apply independent factor prediction (IFP), i.e., each kernel is predicted based on its own history $$\hat{g}_{ij}(t+1) = g_{ij}(t:t-L+1) w_i$$

Another option is to apply joint factor prediction (IFP), i.e., each kernel is predicted based on multiple kernel history $$\hat{g}_{ij}(t+1) = [g_{i1}(t:t-L+1) \ldots g_{iM}(t:t-L+1)] w_i$$

When constructing an orthogonal DFT basis in a frequency/antenna domain, different initial offsets can be added. One method is to first generate a set of over-sampled bases (e.g. $B_{f,OS1}$, $B_{f,OS2}$, $B_{f,OS3}$, $B_{f,OS4}$), and then select one group of orthogonal basis (e.g. $B_{f,OS2}$). Selecting the basis with the proper offset helps to reduce the number of kernels required to represent/predict the channel, as illustrated in FIG. 8.

Figure 8:
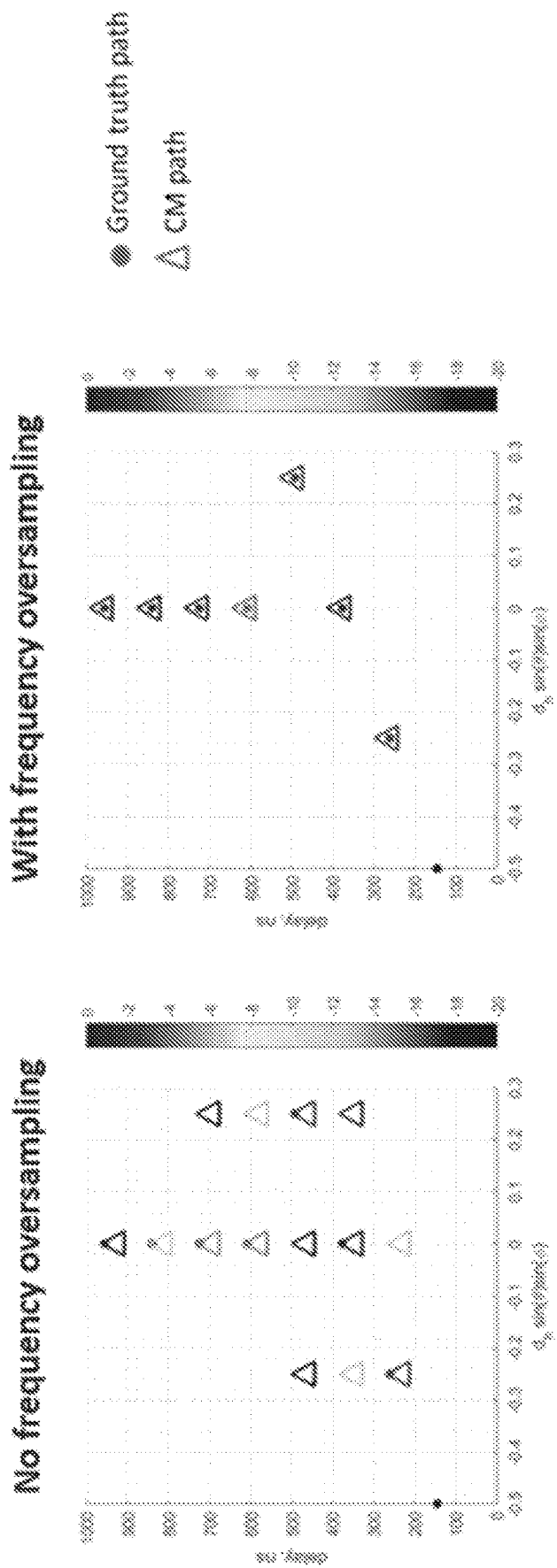
FIG. 8 illustrates an example of oversampling according to embodiments of the present disclosure.

FIG. 8 illustrates an example of oversampling according to embodiments of the present disclosure. The embodiment of oversampling illustrated in FIG. 8 is for illustration only. Different embodiments of oversampling could be used without departing from the scope of this disclosure.

In the example of FIG. 8, the basis set is selected according to an initial buffer of observed SRS (e.g. [H(1), H(2), . . . H(L)]).
Assuming S sets of orthogonal bases are constructed, the projected kernel coefficients from the L SRS observations are denoted as $$[G_1(1),G_1(2), \ldots G_1(L)],[G_2(1),G_2(2), \ldots G_2(L)], \ldots [G_S(1),G_S(2), \ldots G_S(L)]$$

The basis set selection can follow the options described below:

Select basis set according to time correlation.
The intuition for this method is to select the basis set that is most 'invariant' across time. For a basis set s, first down select a subset of kernels. The kernels can be selected according to a percentage of max power, or the kernels corresponding to lowest frequencies (i.e. close to 0 delay, or close to boresight angle). Denote the down selected kernels of basis set s as $[\tilde{G}_s(1), \tilde{G}_s(2), \ldots \tilde{G}_s(L)]$.
According to the initial observation buffer and the down-selected kernels, compute the kernel group's lag l time-domain correlation as $$\mathbb{E}_n\left[\frac{vec(\tilde{G}_s(n)) \cdot vec(\tilde{G}_s^*(n+l))}{\|\tilde{G}_s(n)\|\|\tilde{G}_s(n+l)\|}\right],$$

Or $$\mathbb{E}_n\left[\frac{|vec(\tilde{G}_s(n)) \cdot vec(\tilde{G}_s^*(n+l))|}{\|\tilde{G}_s(n)\|\|\tilde{G}_s(n+l)\|}\right].$$

vec(x) represents vectorising
Select the basis set s that has the maximum time-domain correlation. The lag l can be a design parameters according to the prediction distance.
Another way to compute the correlation is to first normalize the $\tilde{G}_s(n)$ element-wise, such that each element has unit norm, denoted as $\tilde{\tilde{G}}_s(n)$, and then compute the above lag correlation using $\tilde{\tilde{G}}_s(n)$ instead of $\tilde{G}_s(n)$.

Select Basis Set According to Kernel Power Density
The intuition for this method is to select the basis set that can most compactly represent the channel, i.e., with the energy mostly concentrated on a few bases.
One method is to compute the average per basis energy for each basis set as $$p_{s,q} = \frac{\sum_l |G_{s,q}(l)|^2}{L}$$

where $G_{s,q}(l)$ denotes the q-th element in $G_s(l)$.
The per basis energy density is further computed by normalizing the per basis energy by the total average energy of the channel, i.e.

$$\hat{p}_{s,q} = \frac{p_{s,q}}{\mathbb{E}_l \|G_s(l)\|_F^2}.$$

For each basis set, compute how many strongest bases are required to represent a certain percent of the channel energy. The basis set that requires smallest number of bases to achieve the representation shall be chosen.
The basis selection method can be applied to an angular, frequency, and/or Doppler domain.

After the basis set is selected, a subset of kernels may be further down-selected to perform prediction with.
Denote the selected basis set as G, the kernel selection will be based on observations of [G(1), G(2), . . . G(L)].
Denote $g_q$ as the q-th kernel inside the basis set G.

One method is to select the kernels that have maximum energy on average, based on the initial buffer observation. For a given kernel q, compute the average energy as $$p_q = \frac{\sum_l |g_q(l)|^2}{L}.$$

The kernels with largest energy will be selected.
The kernels can be selected based on an energy parameter. For example, the selection can be based on energy greater than a threshold, or accumulated energy up to a certain percentile, or selecting a predefined number of kernels.

Another method is to select the kernels based on their self time-domain correlation. The intuition is, when the kernels are highly correlated across time, it implied the kernels may be close to static; when the kernels have low time-correlation, it may imply they change drastically across time. Therefore, the kernels within a certain time correlation region shall be selected.
For each kernel, compute its lag l time correlation as $c_q = \mathbb{E}_n[g_q(n)g^*_q(n+l)]$, or $$c_q = \mathbb{E}_n\left[\frac{g_q(n)g_q^*(n+l)}{|g_q(n)||g_q(n+l)|}\right]$$

Select the kernels that have $c_q$ within a predefined region.
If applying joint factor prediction, a group of kernels can be jointly selected according to their joint cross correlation in time domain. This may be referred to as a time domain correlation estimation. For instance, the time correlation matrix can be computed as $$C = \mathbb{E}_n\left[\begin{bmatrix}g_1(n)\\g_2(n)\\\vdots\\g_Q(n)\end{bmatrix}\begin{bmatrix}g_1^*(n), g_2^*(n) \ldots g_Q^*(n)\end{bmatrix}\right]$$

The kernel group with self-and-cross time correlation satisfying a threshold will be selected.
Kernels can be selected considering both the power and the time-variation. In this method, a larger subset of kernels are first selected according to the max-energy criteria, and then further down select a subset of kernels according to the time-correlation criteria.
Leveraging the intuition for time-domain correlation, the kernels to perform prediction can be categorized as slow changing or fast changing.

For slow changing kernels, a lower-complexity predictor can be deployed; while for faster changing kernels, a more sophisticated predictor may be required.

The system can apply different predictors according to each kernel's time correlation, and to achieve reduced complexity. This may be referred to as a prediction complexity reduction operation.

The CM uses orthogonal bases. When selecting a subset of kernels, the unselected parts' energy cannot be captured. In some cases, the energy loss may cause prediction performance loss. One remedy is to add back the residue, without performing prediction (for complexity consideration).

When adding back the residue, it can be scaled according to the SNR, and/or the time-correlation.

Option 1: add back the residue in channel domain
After kernel selection, reconstruct projected channel as $$H_{proj}(t) = \sum_{k \in K_S} b_f(\tau_k) \cdot b_a^T(\theta_k) \cdot g_k(t)$$

$K_S$ as the set of selected kernels. Compute residue as $$H_{res}(t) = H_{srs}(t) - H_{proj}(t)$$

In prediction $$H_{pred}(t+1) = \sum_{k \in K_S} b_f(\tau_k) \cdot b_a^T(\theta_k) \cdot \hat{g}_k(t+1) + \alpha H_{res}(t)$$

Option 2: add back the residue in kernel domain
After kernel selection, predict the selected kernels. Hold (part of) the unselected kernels, and add back to prediction $$H_{pred}(t+1) = \sum_{k \in K_S} b_f(\tau_k) \cdot b_a^T(\theta_k) \cdot \hat{g}_k(t+1) + \sum_{k \in K_H} \alpha_k b_f(\tau_k) \cdot b_a^T(\theta_k) \cdot g_k(t)$$

$K_H$ H as the set of kernels to hold, further selected from the unpredicted kernels One criteria is to select the kernels with time-correlation smaller than a threshold.

In above 2 methods, the scaling factor $\alpha$ is applied to the residue part. $\alpha$ can be computed based on SNR, as $$\alpha = \frac{SNR}{1 + SNR}$$

If the residue is operated in kernel domain, the a can be kernel specific.

$\alpha$ can also be computed according to time-domain correlation, e.g.

$$\alpha = \frac{vec(H_{res}(t-1))vec(H_{res}^*(t))}{\|H_{res}(t-1)\|\|H_{res}(t)\|}$$

If the residue is operated in kernel domain, the a can be kernel specific, e.g. per kernel time correlation.

As described previously herein, in the CM channel representation, only a subset of the kernels/bases have significant energy. Therefore, in a low SNR scenario, the kernels/bases with smaller energy are more severely contaminated compared to those with larger energy. When the weaker bases contain mostly noise, removing them from the channel representation can help to de-noise. An example procedure of using CM to de-noise is illustrated in FIG. 9.

Figure 9:
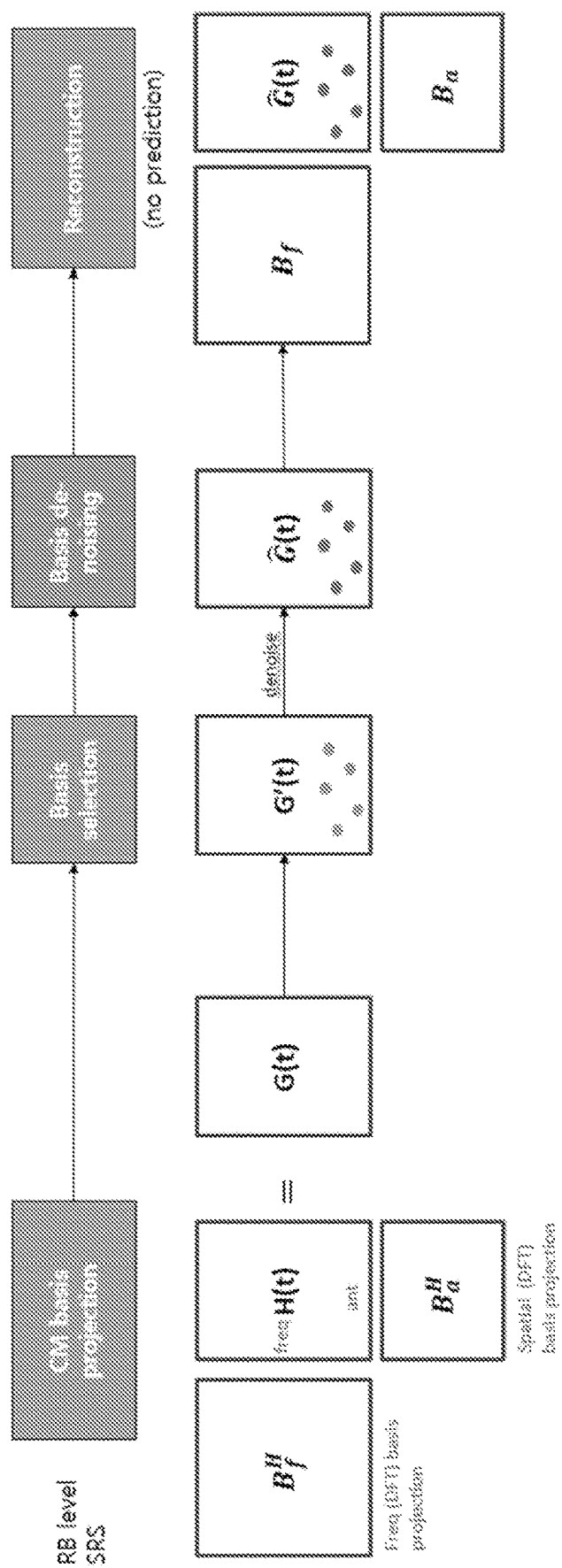
FIG. 9 illustrates an example of de-noising according to embodiments of the present disclosure.

FIG. 9 illustrates an example of de-noising according to embodiments of the present disclosure. The embodiment of de-noising illustrated in FIG. 9 is for illustration only. Different embodiments of de-noising could be used without departing from the scope of this disclosure.

The example of FIG. 9 may be summarized in the following series of steps.

Step 1: Project the channel onto the basis, and obtain the kernel representation at each time instance.

Step 2: select a subset of kernels with most significant energy.

Step 3: for the selected subset of kernels, perform further de-noising if applicable.

Step 4: using selected (and de-noised) kernel coefficients and basis to reconstruct the channel at the current instance.

In one embodiment, projecting the channel can be based on a linear transformation projection. In one embodiment, projecting the channel can be based on a CM basis projection.

In one embodiment, a de-noising operation may be performed by minimum mean-square error (MMSE) based scaling based on estimated SNR for the respective kernels.

From the estimated channel, select the bases with most significant energy, and drop the rest of the kernels; perform a de-noising operation on the selected basis if applicable; and then reconstruct the channel using only the selected few strong bases. Note that compared to the CM based prediction described with respect to FIG. 7, this process has the 'basis de-noising' module in place of the 'basis prediction' module.

Although FIG. 9 illustrates one example of de-noising, various changes may be made to FIG. 9. For example, the steps may change, the subset of kernels may change, etc.

Similar to as discussed in the previously herein, the orthogonal bases can have different initial offset.

The basis can be fixed as the set with a constant initial offset, or can follow the kernel power density bases selection method as described in the previous part.

When selecting the kernels for de-noising purposes, the kernels with largest energy may be selected. Note that for de-noising purpose, the kernels do not have to be consistent in every time snapshot.

The largest energy can be determined instantaneously (e.g. at every SRS reception), or can be determined accumulating a buffer of observations based on their average energy.

The threshold of kernel selection can be based on absolute energy, or the energy percentage of the entire channel, or a fixed number of kernels.

If the group of kernels are selected, and maintained unchanged for a period of time, a further de-noising can be performed on them.

Consider a selected kernel q, and its projected coefficient at channel observation n as $g_q(n)$. Note that it is a noisy observation, with ground truth $g_{q,0}(n)$, such that $$g_q(n) = g_{q,0}(n) + \sigma^2.$$

One can observe a (short) history of $[g_q(n-L), g_q(n-L+1), \ldots g_q(n)]$, and estimate the energy of $g_{q,0}(n)$ as $$s_g = \mathbb{E}_k[g_q(k)g_q^*(k+1)].$$

And the de-noised kernel coefficient can be approximated as $$\hat{g}_q(n) = \frac{s_g}{|g_q(n)|^2} g_q(n).$$

$\hat{g}_q(n)$ will then be used in the channel reconstruction, as $\hat{H}(n)=\Sigma_q b_f(\tau_q) \cdot b_a^T(\theta_q) \cdot \hat{g}_q(n)$.

Figure 10:
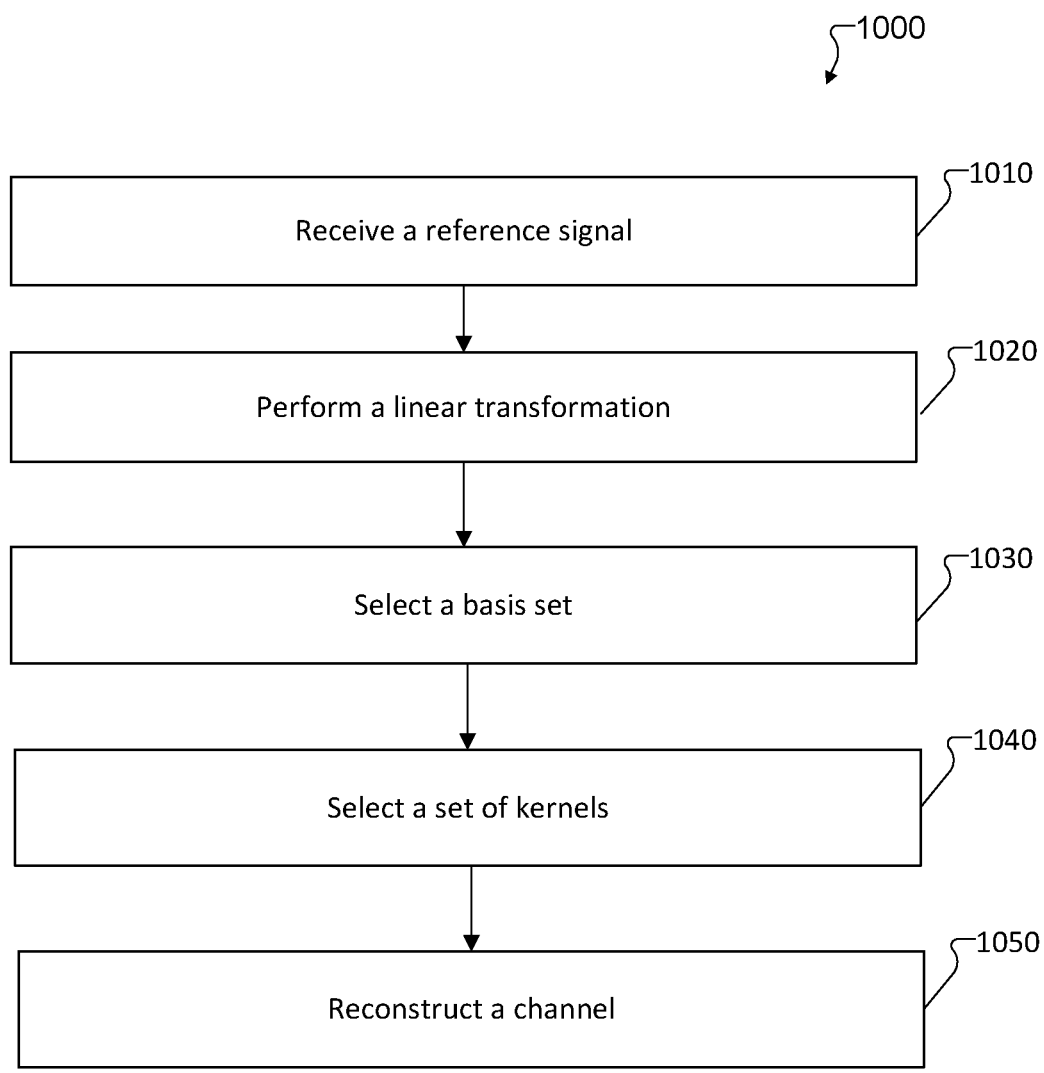
FIG. 10 illustrates an example method for channel status information enhancement according to embodiments of the present disclosure.

FIG. 10 illustrates an example method 1000 for channel status information enhancement according to embodiments of the present disclosure. An embodiment of the method illustrated in FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments of throughput prediction could be used without departing from the scope of this disclosure.

As illustrated in FIG. 10, the method 1000 begins at step 1010. At step 1010, a BS receives a reference signal from a UE. The reference signal may be similar as described regarding FIGS. 4-9. At step 620, the BS performs a linear transformation based on the received reference signal. The linear transformation may be similar as described regarding FIGS. 5-9. At step 630, the BS selects a basis set based on the linear transformation. At step 640, the BS selects a set of kernels based on the selected basis set and the linear transformation. At step 650, the BS reconstructs a channel based on the selected set of kernels.

Although FIG. 10 illustrates one example of a method 1000 for channel status information enhancement, various changes may be made to FIG. 10. For example, while shown as a series of steps, various steps in FIG. 10 could overlap, occur in parallel, occur in a different order, or occur any number of times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A base station (BS) comprising:
a transceiver configured to receive a reference signal from a user equipment (UE); and
a processor operably coupled to the transceiver, the processor configured to:
perform a linear transformation based on the received reference signal;
select a basis set based on the linear transformation;
select a set of kernels based on the selected basis set and the linear transformation; and
reconstruct a channel based on the selected set of kernels.

2. The BS of claim 1, wherein:
the basis set is selected based on one of a time correlation corresponding with the linear transformation and a kernel power density corresponding with the linear transformation;
the set of kernels is selected based on at least one of the time correlation corresponding with the linear transformation and an energy parameter; and
the processor is further configured to:
generate a predicted set of kernels based on the selected set of kernels; and
construct a predicted channel based on the predicted set of kernels, wherein the channel is reconstructed based on the predicted channel.

3. The BS of claim 2, wherein the processor is further configured to:
categorize the set of kernels as fast changing or slow changing; and
perform a prediction complexity reduction operation based on the categorization, wherein the predicted set of kernels are based on the complexity reduction operation.

4. The BS of claim 2, wherein the processor is further configured to:
categorize the set of kernels based on at least one of a Doppler spectrum estimation and a time domain correlation estimation; and
perform a prediction complexity reduction operation based on the categorization, wherein the predicted set of kernels are based on the complexity reduction operation.

5. The BS of claim 2, wherein the processor is further configured to:
determine a set of residual unselected kernels corresponding with the linear transformation;
apply a scaling factor to the set of residual unselected kernels; and
construct a projected channel based on the set of scaled set of residual unselected kernels,
wherein reconstructing the channel comprises adding the projected channel to the predicted channel.

6. The BS of claim 2, wherein the processor is further configured to:
determine a set of residual unselected kernels corresponding with the linear transformation;
apply a scaling factor to the set of residual unselected kernels; and
add the scaled set of residual unselected kernels to the predicted set of kernels,
wherein the predicted channel is based on the addition of the scaled set of residual unselected kernels to the predicted set of kernels.

7. The BS of claim 1, wherein:
the basis set is selected based on one of a constant initial offset related to the linear transformation and a kernel power density related to the linear transformation;
the set of kernels is selected based on an energy parameter; and
the processor is further configured to perform a de-noising operation on the set of kernels, wherein the channel is reconstructed based on the de-noised set of kernels.

8. The BS of claim 1, wherein the linear transformation is a canonical model (CM) basis projection.

9. A method performed by a base station (BS), the method comprising:
receiving a reference signal from a user equipment (UE);
performing a linear transformation based on the received reference signal;
selecting a basis set based on the linear transformation;
selecting a set of kernels based on the selected basis set and the linear transformation; and
reconstructing a channel based on the selected set of kernels.

10. The method of claim 9, wherein:
the basis set is selected based on one of a time correlation corresponding with the linear transformation and a kernel power density corresponding with the linear transformation;
the set of kernels is selected based on at least one of the time correlation corresponding with the linear transformation and an energy parameter, wherein the method further comprises:
generating a predicted set of kernels based on the selected set of kernels; and
constructing a predicted channel based on the predicted set of kernels, wherein the channel is reconstructed based on the predicted channel.

11. The method of claim 10, further comprising:
categorizing the set of kernels as fast changing or slow changing; and
performing a prediction complexity reduction operation based on the categorization, wherein the predicted set of kernels are based on the complexity reduction operation.

12. The method claim 10, further comprising:
categorizing the set of kernels based on at least one of a Doppler spectrum estimation and a time domain correlation estimation; and
performing a prediction complexity reduction operation based on the categorization, wherein the predicted set of kernels are based on the complexity reduction operation.

13. The method of claim 10, further comprising:
determining a set of residual unselected kernels corresponding with the linear transformation;
applying a scaling factor to the set of residual unselected kernels; and
constructing a projected channel based on the set of scaled set of residual unselected kernels,
wherein reconstructing the channel comprises adding the projected channel to the predicted channel.

14. The method of claim 10, further comprising:
determining a set of residual unselected kernels corresponding with the linear transformation;
applying a scaling factor to the set of residual unselected kernels; and
adding the scaled set of residual unselected kernels to the predicted set of kernels,
wherein the predicted channel is based on the addition of the scaled set of residual unselected kernels to the predicted set of kernels.

15. The method of claim 9, wherein:
the basis set is selected based on one of a constant initial offset related to the linear transformation and a kernel power density related to the linear transformation;
the set of kernels is selected based on an energy parameter; and
the method further comprises performing a de-noising operation on the set of kernels, wherein the channel is reconstructed based on the de-noised set of kernels.

16. The method of claim 9, wherein the linear transformation is a canonical model (CM) basis projection.

17. A non-transitory computer readable medium embodying a computer program, the computer program comprising program code that, when executed by a processor of a device, causes the device to:
receive a reference signal from a user equipment (UE);
perform a linear transformation based on the received reference signal;
select a basis set based on the linear transformation;
select a set of kernels based on the selected basis set and the linear transformation; and
reconstruct a channel based on the selected set of kernels.

18. The non-transitory computer readable medium of claim 17, wherein:
the basis set is selected based on one of a time correlation corresponding with the linear transformation and a kernel power density corresponding with the linear transformation;
the set of kernels is selected based on at least one of the time correlation corresponding with the linear transformation and an energy parameter, wherein the computer program further comprises program code that, when executed by the processor of the device, causes the device to:
generate a predicted set of kernels based on the selected set of kernels; and
construct a predicted channel based on the predicted set of kernels, wherein the channel is reconstructed based on the predicted channel.

19. The non-transitory computer readable medium of claim 17, wherein:
the basis set is selected based on one of a constant initial offset related to the linear transformation and a kernel power density related to the linear transformation;
the set of kernels is selected based on an energy parameter; and
the processor is further configured to perform a de-noising operation on the set of kernels, wherein the channel is reconstructed based on the de-noised set of kernels.

20. The non-transitory computer readable medium of claim 17, wherein the linear transformation is a canonical model (CM) basis projection.

* * * * *